(12) United States Patent
Fujita et al.

(10) Patent No.: US 6,454,043 B2
(45) Date of Patent: Sep. 24, 2002

(54) ELECTRIC POWER STEERING APPARATUS

(75) Inventors: Hiroshi Fujita; Yoshitaka Tsuboi, both of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/793,285

(22) Filed: Feb. 26, 2001

(30) Foreign Application Priority Data

Apr. 25, 2000 (JP) ........................................ 2000-124912

(51) Int. Cl.[7] ................................................. B62D 5/04
(52) U.S. Cl. ...................................................... 180/444
(58) Field of Search ................................ 180/443, 444, 180/446

(56) References Cited

U.S. PATENT DOCUMENTS 4,865,145 A * 9/1989 Ijiri et al. ................... 180/444
5,738,183 A * 4/1998 Nakajima et al. ........... 180/444

FOREIGN PATENT DOCUMENTS

| JP | 834355 | 2/1996 | ............ B62D/5/04 |
| JP | 08034355 A | * 2/1996 | ............ B62D/5/04 |

* cited by examiner

Primary Examiner—Kevin Hurley
(74) Attorney, Agent, or Firm—Orum & Roth

(57) ABSTRACT

In a motor-driven power steering apparatus, a grease storage is provided in a lower portion of an engagement portion between a drive gear and an intermediate gear in a housing, and a partition wall for preventing a lubricating material or grease from flowing down from the grease storage to an engagement portion between a pinion shaft and a rack shaft is provided in a periphery of a pinion shaft inserting portion of the housing.

2 Claims, 4 Drawing Sheets

ELECTRIC POWER STEERING APPARATUS

BACKGROUND OF THE INVENTION

1. Field of the Invention

The present invention relates to an electric power steering apparatus.

2. Description of the Related Art

As shown in a Japanese unexamined Patent Publication No. (JP-A) 8-34355, an electric power steering apparatus is structured such that a pinion shaft connected to a steering shaft is engaged with a rack shaft. A worm gear is provided in a drive shaft connected to an electric motor and a worm wheel engaged with the worm gear is connected to the pinion shaft, whereby a torque of the motor is transmitted to the rack shaft so as to assist a steering operation.

In an electric power steering apparatus, one type of lubricating material or grease is used for an engagement portion between the pinion shaft and the rack shaft, and another type of lubricating material or grease is used for an engagement portion between the worm gear and the worm wheel. The two engagement portions mentioned above are arranged within a housing which forms the same space, and the engagement portion between the worm gear and the worm wheel is positioned above the engagement portion between the pinion shaft and the rack shaft. Accordingly, in the conventional art, the lubricating material in the engagement portion between the worm gear and the worm wheel flows down to a lower engagement portion between the pinion shaft and the rack shaft so as to be mixed with the lubricating material in the engagement portion between the pinion shaft and the rack shaft. This generates an unexpected change in the nature of the grease to be used for the engagement portion between the pinion shaft and the rack shaft and causes a reduction of durability due to an inferior lubrication between the pinion shaft and the rack shaft.

SUMMARY OF THE INVENTION

An object of the present invention is to improve lubricating performance between a pinion shaft and a rack shaft and improve a durability thereof at while simultaneously providing both engagement portion between the pinion shaft and the rack shaft and engagement portion between a drive gear and an intermediate gear in the same space formed by a housing, in an electric power steering apparatus.

In accordance with the present invention, there is provided an electric power steering apparatus comprising:

a pinion shaft connected to a steering shaft, the pinion shaft being inserted to an inner portion of a housing so as to be engaged with a rack shaft.

A drive gear is provided, connected to an electric motor, and an intermediate gear connected to the pinion shaft, the drive gear and the intermediate gear being engaged with each other in an upper portion of an engagement portion between the pinion shaft and the rack shaft disposed within the housing.

Storage for the lubricating material is provided in a lower portion of the engagement portion between the drive gear and the intermediate gear in the housing. A partition wall prevents the lubricating material from dripping down from the storage area to an area where the engagement portion between the pinion shaft and the rack shaft is provided in a periphery of a portion through which the pinion shaft of the housing is inserted.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

Figure 1:
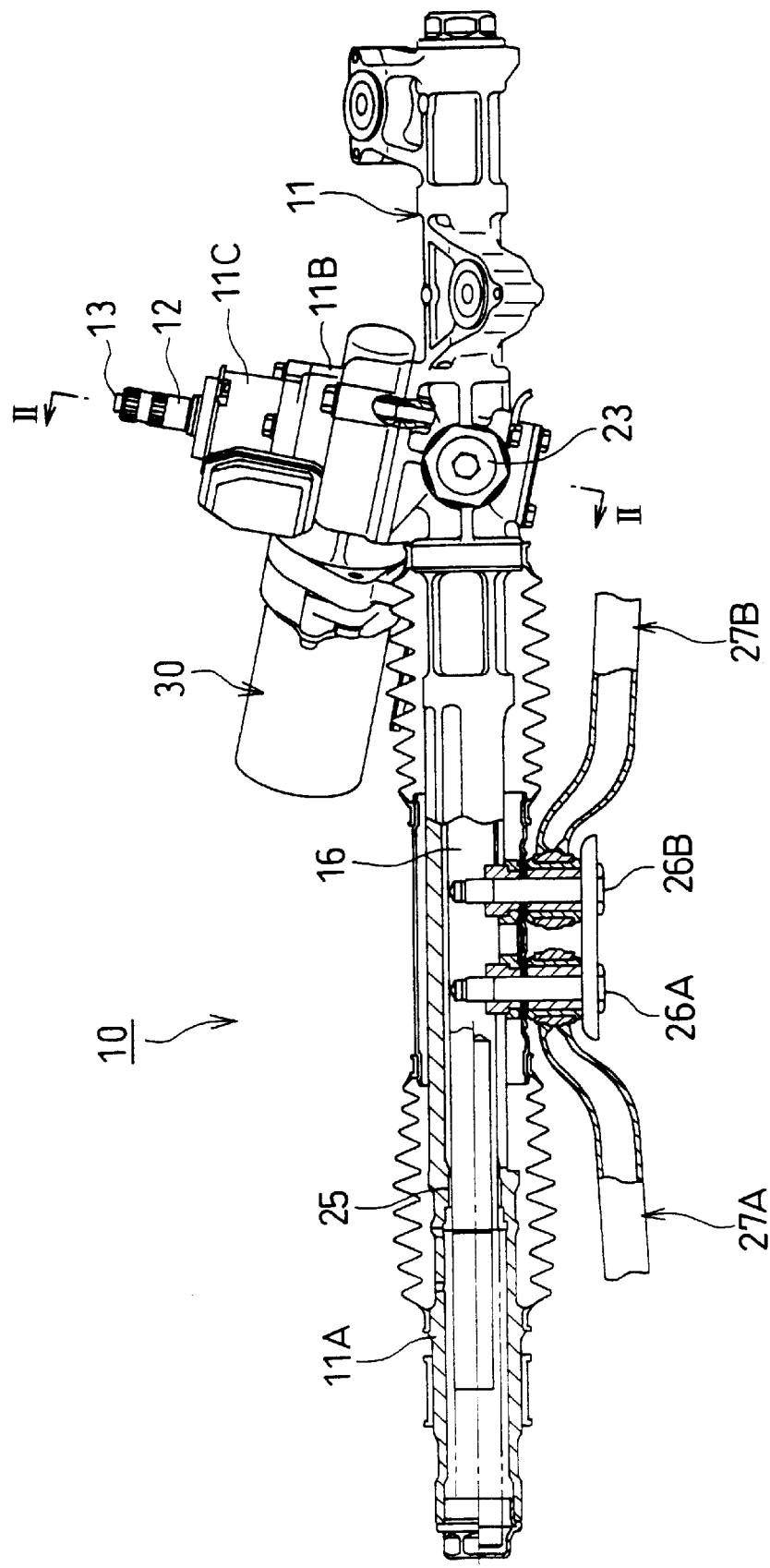
FIG. 1 is a front elevational view showing an electric power steering apparatus in a partly broken manner.
Figure 2:
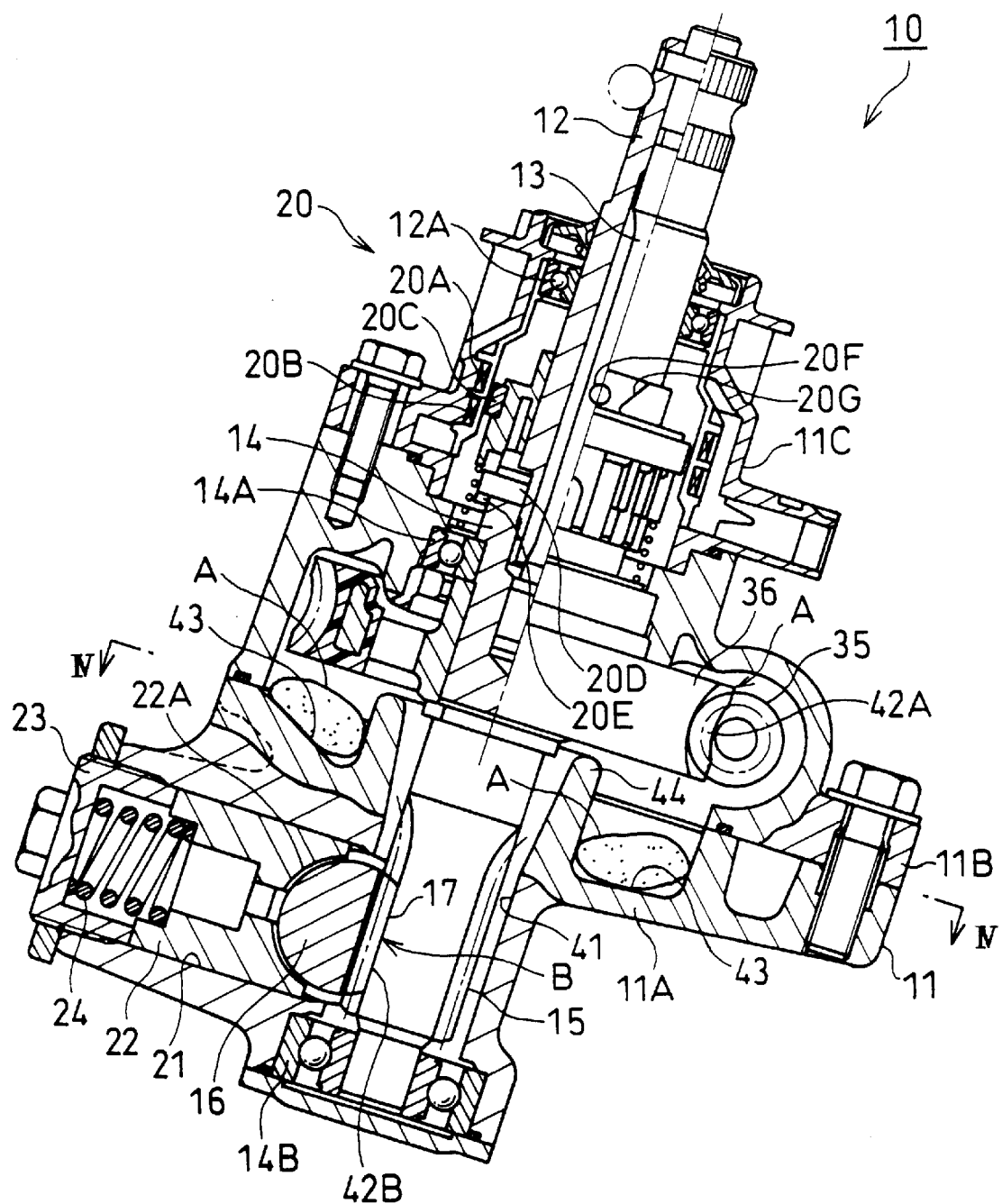
FIG. 2 is a cross sectional view along a line II—II in FIG. 1.

An electric power steering apparatus 10 has a housing 11 first to third housings 11A to 11C) fixed to a vehicle body frame or the like by a bracket (not shown), as shown in FIGS. 1 and 2. The electric power steering apparatus 10 is structured such that a pinion shaft 14 is connected to a steering shaft 12 to which a steering wheel is connected via a torsion bar 13. A pinion 15 is provided in the pinion shaft 14 and a rack shaft 16 provided with a rack 17 engaged with the pinion 15 is supported to the first housing 11A in such a manner as to freely move in a lateral direction. A steering torque detecting apparatus 20 is provided between the steering shaft 12 and the pinion shaft 14. In this case, the steering shaft 12 and the pinion shaft 14 are supported to the housing 11 via bearings 12A, 14A and 14B.

The steering torque detecting apparatus 20 is, as shown in FIG. 2, provided with two detecting coils 20A and 20B surrounding a cylindrical core 20C engaged with the steering shaft 12 and the pinion shaft 14 in the third housing 11C. The core 20C is provided with a vertical groove 20E engaging with a guide pin 20D of the pinion shaft 14 so as to freely move only in an axial direction. It is also provided with a spiral groove 20G engaging with a slider pin 20F of the steering shaft 12. Accordingly, when a steering torque applied to the steering wheel is applied to the steering shaft 12 and a relative displacement in a rotational direction is generated between the steering shaft 12 and the pinion shaft 14 due to an elastic torsional deformation of the torsion bar 13, the displacement in the rotational direction of the steering shaft 12 and the pinion shaft 14 causes displacement of the core 20C in an axial direction. An inductance of the detecting coils 20A and 20B due to a magnetic change in the periphery of the detecting coils 20A and 20B generated by the displacement of the core 20C is changed. When the core 20C moves toward the steering shaft 12, an inductance of the detecting coil 20A disposed in a side to which the core 20C moves is increased, and an inductance of the detecting coil 20B disposed in a side from which the core 20C moves apart is reduced, whereby it is possible to detect the steering torque due to the change of the inductance.

A rack guide 22 is installed, as shown in FIG. 2, in a cylinder portion 21 provided in a portion opposing the pinion 15 with respect to the rack shaft 16 within the first housing 11A The rack guide 22 (a bush 22A) is elastically provided in a side of the rack shaft 16 by a spring 24 supported on a back surface by a cap 23 attached to the cylinder portion 21 so as to press the rack 17 of the rack shaft 16 to the pinion 15 and slidably support one end of the rack shaft 16. In this case, another end side of the rack shaft 16 is supported by bearing 25. Further, right and left tie rods 27A and 27B are connected to an intermediate portion of the rack shaft 16 by connecting bolts 26A and 26B.

The second housing 11B supports an electric motor 30, as shown in FIG. 1. A drive shaft (not shown in the figure) is connected to an output shaft 31 of the electric motor 30 via a clutch, the drive shaft (not shown in the figure) is supported to the housing 11B by bearing device at both ends, and a worm gear (a drive gear) 35 is integrally provided in an intermediate portion of the drive shaft (not shown in the figure). Then, a worm wheel 36 (an intermediate gear) engaging with the worm gear 35 is fixed to an intermediate portion of the pinion shaft 14. A generated torque of the electric motor 30 is applied as a steering assist force to the rack shaft 16 via an engagement between the worm gear 35 and the worm wheel 36 and an engagement between the pinion 15 and the rack 17 so as to assist steering force which a driver applies to the steering shaft 12. In this case, reference numerals 33A and 33B denote an outer wheel lock nut and an inner wheel stopper ring of the bearing 33, respectively.

In the electric power steering apparatus 10, as mentioned above, the pinion shaft 14 (the pinion 15) connected to the steering shaft 12 is inserted into the pinion shaft inserting portion 41 within the first housing 11A so as to be engaged with the rack shaft 16 (the rack 17) (corresponding to the engagement portion 42B), and the worm gear 35 connected to the electric motor 30 and the worm wheel 36 connected to the pinion shaft 14 are engaged with each other at the upper portion of the engagement portion 42B between the pinion shaft 14 and the rack shaft 16 which is disposed within the second housing 11B (corresponding to the engagement portion 42A). The engagement portion 42A and the engagement portion 42B are commonly disposed in the same space which both of the housings 11A and 11B commonly form. Accordingly, there is a difference between a kind of a lubricating material or grease A applied to the engagement portion 42A between the worm gear 35 and the worm wheel 36 and another kind of a lubricating material or grease B applied to the engagement portion 42B between the pinion 15 and the rack 17.

Figure 3:
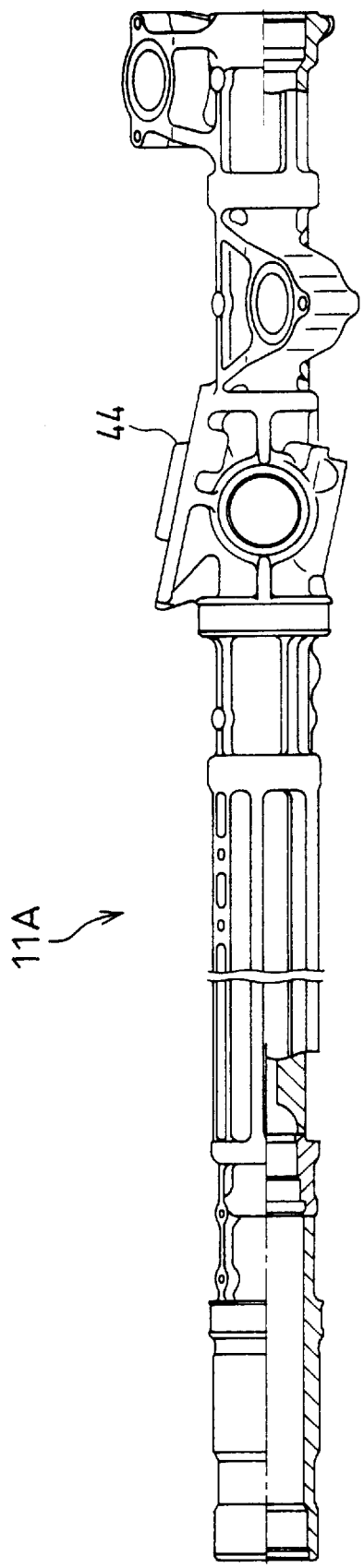
FIG. 3 is a front elevational view showing a housing.
Figure 4:
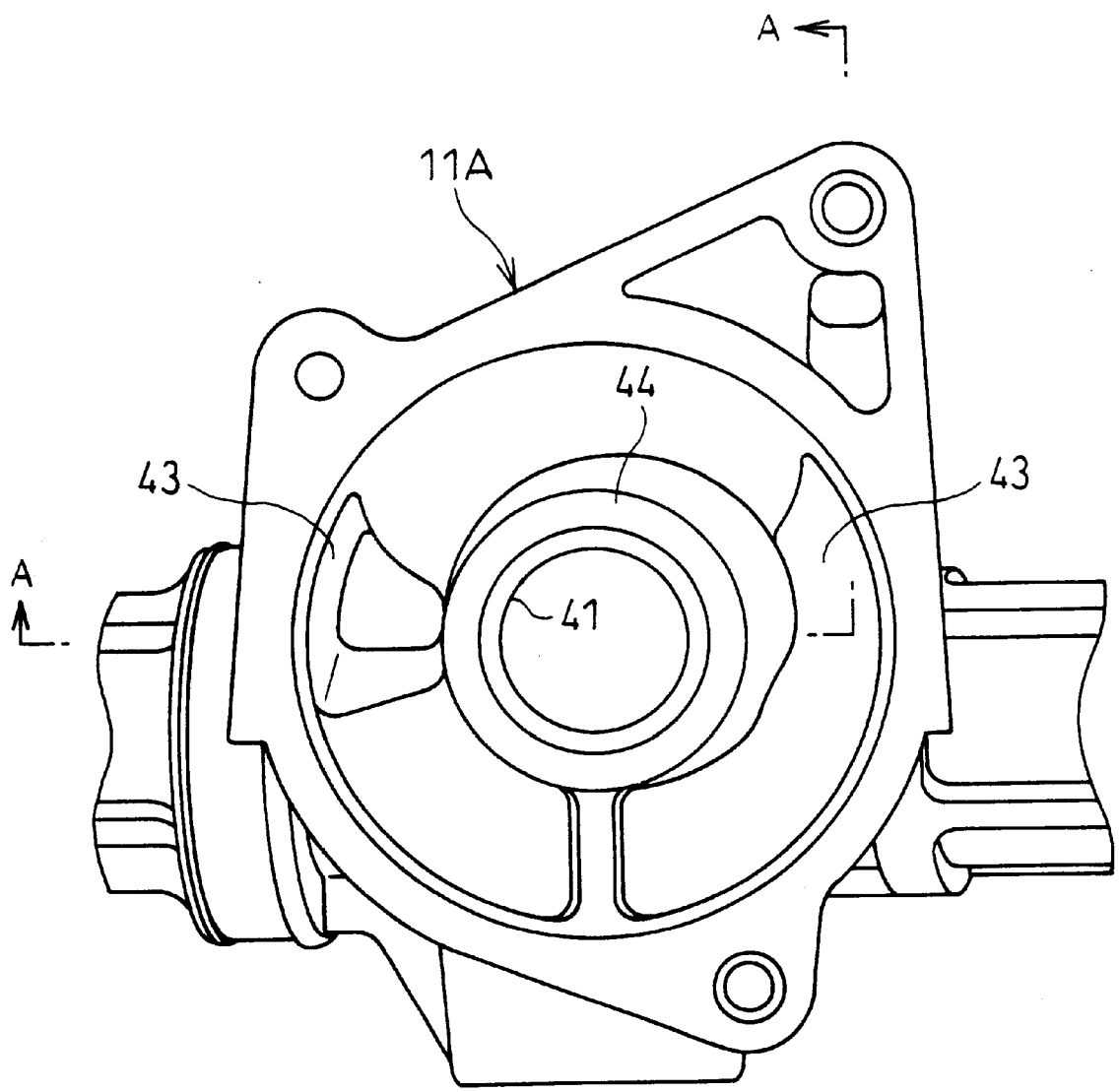
FIG. 4 is an end surface view along a line IV—IV in FIG. 2.

Accordingly, in the electric power steering apparatus 10, in the first housing 11A shown in FIG. 3, a grease storage 43 is provided in a lower portion of the engagement portion 42A between the worm gear 35 and the worm wheel 36, as shown in FIGS. 2 and 4. A cross section at which the grease storage 43 in FIG. 2 is positioned is along a line A—A in FIG. 4. The grease storage 43 is placed in the periphery of the pinion shaft inserting portion 41 mentioned above in the first housing 11A and is formed in a groove shape extending along a tooth face of the worm wheel 36. In this case, the grease storage 43 is not limited to a structure partly provided along the periphery of the pinion shaft inserting portion 41 (FIG. 4), and may be structured such as to be continuously provided in all the periphery.

Further, in the electric power steering apparatus 10, a ring-shaped partition wall 44 is provided in the periphery of the pinion shaft inserting portion 41 mentioned above in the first housing 11A in a standing manner. The partition wall 44 prevents the lubricating material or grease A from flowing down from the grease storage 43 to the side of the engagement portion 42B between the pinion shaft 14 (the pinion 15) and the rack shaft 16 (the rack 17).

Therefore, in accordance with the present embodiment, the following effects can be obtained.

(1) The lubricating material or grease A in the engagement portion 42A between the worm gear 35 and the worm wheel 36 can be received by the grease storage 43 in the lower portion thereof even when dropping down, and is prevented by the existence of the partition wall 44 from flowing downward in the side of the pinion shaft 14. Accordingly, even in the case that the engagement portion 42B between the pinion shaft 14 and the rack shaft 16 and the engagement portion 42A between the worm gear 35 and the worm wheel 36 are commonly disposed in the same space formed by the housing 11 (11A and 11B), the lubricating material or grease A in the engagement portion 42A between the worm gear 35 and the worm wheel 36 does not flow down to the side of the engagement portion 42B between the lower pinion shaft 14 and the rack shaft 16 and is not mixed into the lubricating material or grease B in the engagement portion 42B between the pinion shaft 14 and the rack shaft 16 so as to change the nature thereof, so that an inferior lubrication is not generated in the engagement portion 42B between the pinion shaft 14 and the rack shaft 16 and it is possible to improve a durability thereof (2) Since the lubricating material or grease storage 43 is formed in the groove shape along the tooth face of the worm wheel 36, it is possible to securely receive the grease A migrating down from the engagement portion 42A between the worm gear 35 and the worm wheel 36 by the grease storage 43.

(3) When the grease storage 43 is structured such as to extend along only a part of the tooth face of the worm wheel 36 in the peripheral direction, when providing the groove-shaped grease storage 43 in the housing 11, it is possible to reduce a portion in which the outer wall of the housing 11 protrudes outward due to the formation of the grease storage 43, so that it is possible to make the housing 11 and in its turn the electric power steering apparatus 10 compact.

As heretofore explained, embodiments of the present invention have been described in detail with reference to the drawings. However, the specific configurations of the present invention are not limited to the embodiments but those having a modification of the design within the range of the present invention are also included in the present invention. For example, in accordance with the present invention, the dive gear and the intermediate gear interposed between the electric motor and the pinion shaft are not limited to those constituted by the worm gear mechanism, and may be constituted by the other structures comprising a bevel-shaped gear mechanism such as a hypoid gear, a bevel gear or the like. Likewise, the lubricating material may comprise any suitable substance.

As mentioned above, in accordance with the present invention, in the electric power steering apparatus, it is possible to improve lubricating performance between the pinion shaft and the rack shaft and improve durability thereof while simultaneously disposing the engagement portion between the pinion shaft and the rack shaft and the engagement portion between the drive gear and the intermediate gear in the same space formed by the housing. Further, it is possible to integrally assemble with the housing without independently assembling a seal member or the like for preventing the grease from flowing down later, so that it is easy to assemble the structure.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. An electric power steering apparatus comprising: a pinion shaft connected to a steering shaft, the pinion shaft being inserted to an inner portion of a housing so as to be engaged with a rack shaft; and a drive gear connected to an electric motor and an intermediate gear connected to the pinion shaft, the drive gear and the intermediate gear being engaged with each other in an upper portion of an engagement portion between said pinion shaft and said rack shaft disposed within the housing, wherein a lubricating material storage is provided in a lower portion of the engagement portion between said drive gear and the intermediate gear in the housing, and a partition wall for preventing the lubricating material from migrating down from said storage to a side of the engagement portion between said pinion shaft and the rack shaft is provided in a periphery of a portion through which the pinion shaft of said housing is inserted, wherein when said drive gear is constituted by a worm gear and said intermediate gear is constituted by a worm wheel, said storage is formed in a groove shape extending along a tooth face of the worm wheel.

2. An electric power steering apparatus comprising: a pinion shaft connected to a steering shaft, the pinion shaft being inserted to an inner portion of a housing so as to be engaged with a rack shaft; and a drive gear connected to an electric motor and an intermediate gear connected to the pinion shaft, the drive gear and the intermediate gear being engaged with each other in an upper portion of an engagement portion between said pinion shaft and said rack shaft disposed within the housing, wherein a lubricating material storage is provided in a lower portion of the engagement portion between said drive gear and the intermediate gear in the housing, and a partition wall for preventing the lubricating material from migrating down from said storage to a side of the engagement portion between said pinion shaft and the rack shaft is provided in a periphery of a portion through which the pinion shaft of said housing is inserted, wherein when said drive gear is constituted by a worm gear and said intermediate gear is constituted by a worm wheel, said storage is formed in a groove shape extending along a tooth face of the worm wheel, wherein said groove-shaped storage is extended along only a part of the tooth face of the worm wheel in the peripheral direction.

* * * * *